United States Patent
Mabuchi et al.

(10) Patent No.: US 11,196,950 B2
(45) Date of Patent: Dec. 7, 2021

(54) DARK CURRENT REDUCTION FOR IMAGE SENSOR HAVING ELECTRONIC GLOBAL SHUTTER AND IMAGE STORAGE CAPACITORS

(71) Applicant: OmniVision Technologies, Inc., Santa Clara, CA (US)

(72) Inventors: Keiji Mabuchi, Los Altos, CA (US); Sohei Manabe, San Jose, CA (US); Lindsay Grant, Los Gatos, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/506,693

(22) Filed: Jul. 9, 2019

(65) Prior Publication Data
US 2021/0014440 A1    Jan. 14, 2021

(51) Int. Cl.
| | |
|---|---|
| *H04N 5/357* | (2011.01) |
| *H04N 5/374* | (2011.01) |
| *H04N 5/369* | (2011.01) |
| *H04N 5/361* | (2011.01) |
| *H04N 5/3745* | (2011.01) |
| *H04N 5/378* | (2011.01) |

(52) U.S. Cl.
CPC .......... *H04N 5/361* (2013.01); *H04N 5/3575* (2013.01); *H04N 5/3698* (2013.01); *H04N 5/378* (2013.01); *H04N 5/37452* (2013.01); *H04N 5/37457* (2013.01)

(58) Field of Classification Search
None
See application file for complete search history.

(56) References Cited

U.S. PATENT DOCUMENTS

| | | | | |
|---|---|---|---|---|
| 5,698,844 | A | * 12/1997 | Shinohara | H04N 5/363 250/208.1 |
| 6,069,376 | A | * 5/2000 | Merrill | H01L 27/14609 257/290 |
| 6,720,592 | B1 | * 4/2004 | Kindt | H01L 27/14601 250/208.1 |
| 2009/0057536 | A1 | * 3/2009 | Hirose | G01J 1/1626 250/208.1 |

OTHER PUBLICATIONS

Kondo, T. et al., A 3D Stacked 16Mpixel Global-shutter CMOS Image Sensor Using 4 Million Interconnections, ITE Trans, on MTA vol. 4, No. 2, pp. 129-135 (2016).

* cited by examiner

*Primary Examiner* — Mark T Monk
(74) *Attorney, Agent, or Firm* — Lathrop GPM LLP (57) ABSTRACT

An image sensor has an array of pixels, each pixel having an associated shutter transistor coupled to transfer a charge dependent on light exposure of the pixel onto an image storage capacitor, the image-storage capacitors being configured to be read into an analog to digital converter. The shutter transistors are P-type transistors in N-wells, the wells held at an analog power voltage to reduce sensitivity of pixels to dark current; in an alternative embodiment the shutter transistors are N-type transistors in P-wells, the wells held at an analog ground voltage.

19 Claims, 6 Drawing Sheets

DARK CURRENT REDUCTION FOR IMAGE SENSOR HAVING ELECTRONIC GLOBAL SHUTTER AND IMAGE STORAGE CAPACITORS

BACKGROUND

Image sensors having global electronic shutters are useful for high speed photography. These image sensors may copy charge from many pixels simultaneously (or nearly simultaneously) into image storage capacitors, then read these image storage capacitors to image processing circuitry sequentially. By using a full-frame reset ending at the start of a shutter interval, followed by copying charge from pixels of an entire image into image storage capacitors at the end of the shutter interval, an image is captured undistorted by movement of a subject as the shutter interval begins and ends.

In some cameras, a high-speed burst of resets, followed by a high-speed burst of reads performed at the end of a shutter interval, can provide images with little if any distortion due to movement as the shutter interval ends.

A prior art pixel 100 (FIG. 1) for an image sensor has a photodiode 102 coupled through a first selection transistor 104 controlled by a photodiode selection line 106 to a first pixel node 108. First pixel node 108 couples through a first reset transistor 110 to an analog power 111. The first reset transistor 110 is controlled by a first reset line 112 and selectively resets the photodiode 102. The first pixel node 108 also controls a first source-follower transistor 114. The first source-follower transistor 114 is coupled in series with a second selection transistor 116 controlled by first select line 117 to a loaded node 118 and a first terminal of a first, or coupling, capacitor 120. The loaded node 118 also couples to a load transistor 122 operated as a current source with grounded source and a current-mirror control voltage 124 on its gate.

Figure 1:
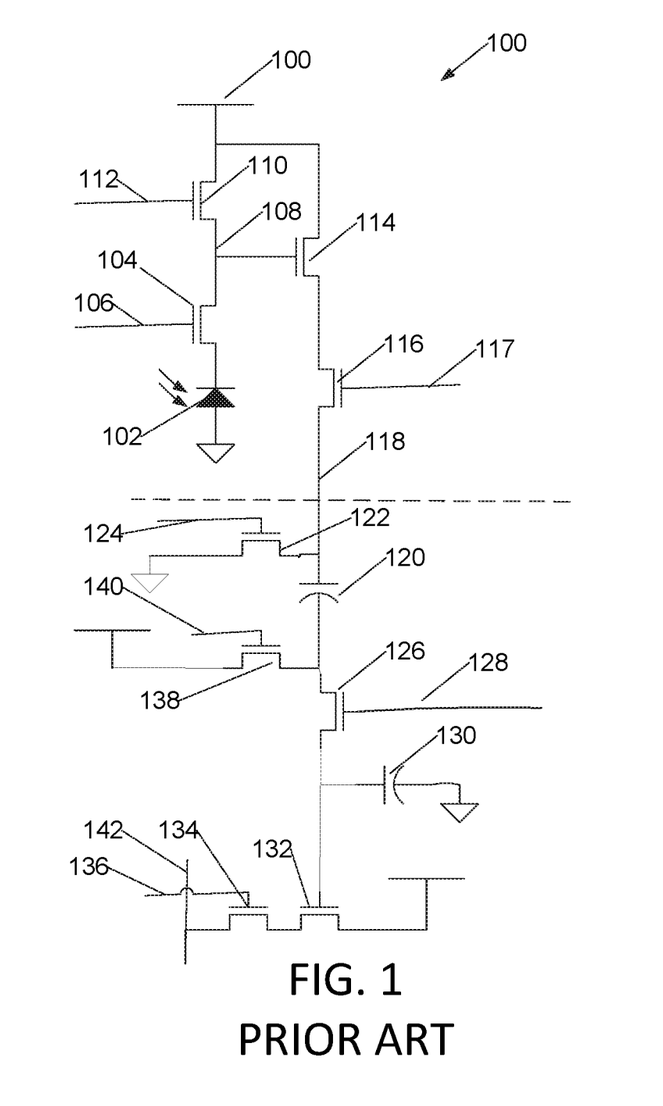
FIG. 1 is a simplified schematic diagram of a pixel and associated circuitry of a PRIOR ART image sensor.

First, or coupling, capacitor 120, which serves as a coupling capacitor, has a second terminal coupled through a shutter transistor 126 to a first terminal of an image-storage capacitor 130. The shutter transistor 126 is controlled by a shutter line 128. The first terminal of the image-storage capacitor 130 also controls a second source-follower transistor 132. A second reset transistor 138, controlled by a second reset line 140, also couples to the second terminal of first, or coupling, capacitor 120. The second source-follower transistor 132 is in series with a third selection transistor 134 controlled by a data selection line 136. The third selection transistor 134 is coupled to drive a data line 142 that in turn couples through additional circuitry to an analog-to-digital converter (not shown) and thence to an image processor for further image data processing. All devices in pixel 100 shown in FIG. 1 are N-channel transistors.

For some pixels, charge may be stored on the image-storage capacitor 130 for the majority of a frame time, in embodiments a frame time may be 16.6 milliseconds for a 60 frame per second video rate or 33 milliseconds for a 30 frame per second video rate, while other pixels may need to store charge for far shorter times.

Practical switching transistors, such as shutter transistors 126, associated with the image-storage capacitors 130 leak, particularly in the contact diffusion area; leakage current in these transistors that causes dark current and white pixel issues. Leakage in shutter transistors 126 typically shifts voltage on the image-storage capacitors 130 from a voltage associated with full black towards a voltage associated with light having been detected by the associated photodiodes 102.

Correlated double sampling (CDS) has been employed in image sensors to eliminate some unwanted temporal noise such as fixed pattern noise by subtracting a dark or reference out level of a pixel from the actual light-induced signal. CDS operations require two read outs per pixel: a dark current or reference level read out and light-induced signal read out at the floating diffusion region of the pixel. At least two capacitors are included for each pixel circuit with one reset capacitor for temporarily storing the dark current or reference level voltage signal and one image storage capacitor for storing the light-induced signal to provide signals for subsequent differential amplification that removes the unwanted noise.

SUMMARY

An image sensor has an array of pixels, each pixel having an associated shutter transistor coupled to transfer a charge dependent on light exposure of the pixel onto an image-storage capacitor. The image-storage capacitors are configured to be read into an analog to digital converter. The shutter transistors are P-type transistors in N– wells held at an analog power voltage to reduce sensitivity of pixels to dark current.

In an embodiment, an image sensor has an array of pixels, each pixel having an associated shutter transistor coupled to simultaneously transfer a charge dependent on light exposure to the pixel onto an image-storage capacitor, the image-storage capacitors being configured to be read into an analog to digital converter, where the shutter transistors are formed in wells coupled to a power supply, and where a dark exposure level of the pixel corresponds to a voltage in the image-storage capacitor near a voltage of a power supply coupled to the well in which the shutter transistor is formed, and a white exposure level of the pixel corresponds to a voltage in the image-storage capacitor significantly different from the power supply coupled to the well in which the shutter transistor is formed.

In an embodiment, a method of capturing a digital electronic image including resetting a plurality of photodiodes, and exposing the photodiodes to an optical image reading the photodiodes and storing charge dependent on photodiode exposure onto a plurality of image storage capacitors, charge being stored onto each image-storage capacitor through nodes where all attached source/drain diffusions are P-type, the charge dependent on photodiode exposure provides a higher voltage on the image-storage capacitor for photodiodes exposed to dark portions of the optical image than for photodiodes exposed to light portions of the optical image; sensing charge in the image storage capacitors with N-channel source followers into an analog to digital converter; and using the analog to digital converter to convert the sensed charge into a digital image.

BRIEF DESCRIPTION OF THE FIGURES

The present invention may be better understood, and its numerous objects, features and advantages made apparent to those skilled in the art by referencing the accompanying drawings. The use of the same reference number throughout the figures designates a like or similar element.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION OF THE EMBODIMENTS

In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Terms such as "first", "second", and "third" are used in this specification in order to avoid confusion among components and do not limit the order or the like. Therefore, for example, the term "first" can be replaced with the term "second", "third", or the like as appropriate.

Throughout this specification, several terms of art are used. These terms are to take on their ordinary meaning in the art from which they come, unless specifically defined herein or the context of their use would clearly suggest otherwise. For example, the term "or" is used in the inclusive sense, as in "and/or", unless the context clearly indicates otherwise. It should be noted that element names and symbols may be used interchangeably through this document (e.g., Si vs. silicon); however, both have identical meaning.

Applicant believes that much of the leakage current in transistors associated with image storage capacitors is associated with the diffused source and drain regions of the shutter transistor 126 (FIG. 1). The leakage at the source and drain regions is a function of voltage differences between the source and drain regions, the well and/or the substrate into which they are diffused.

Figure 2A:
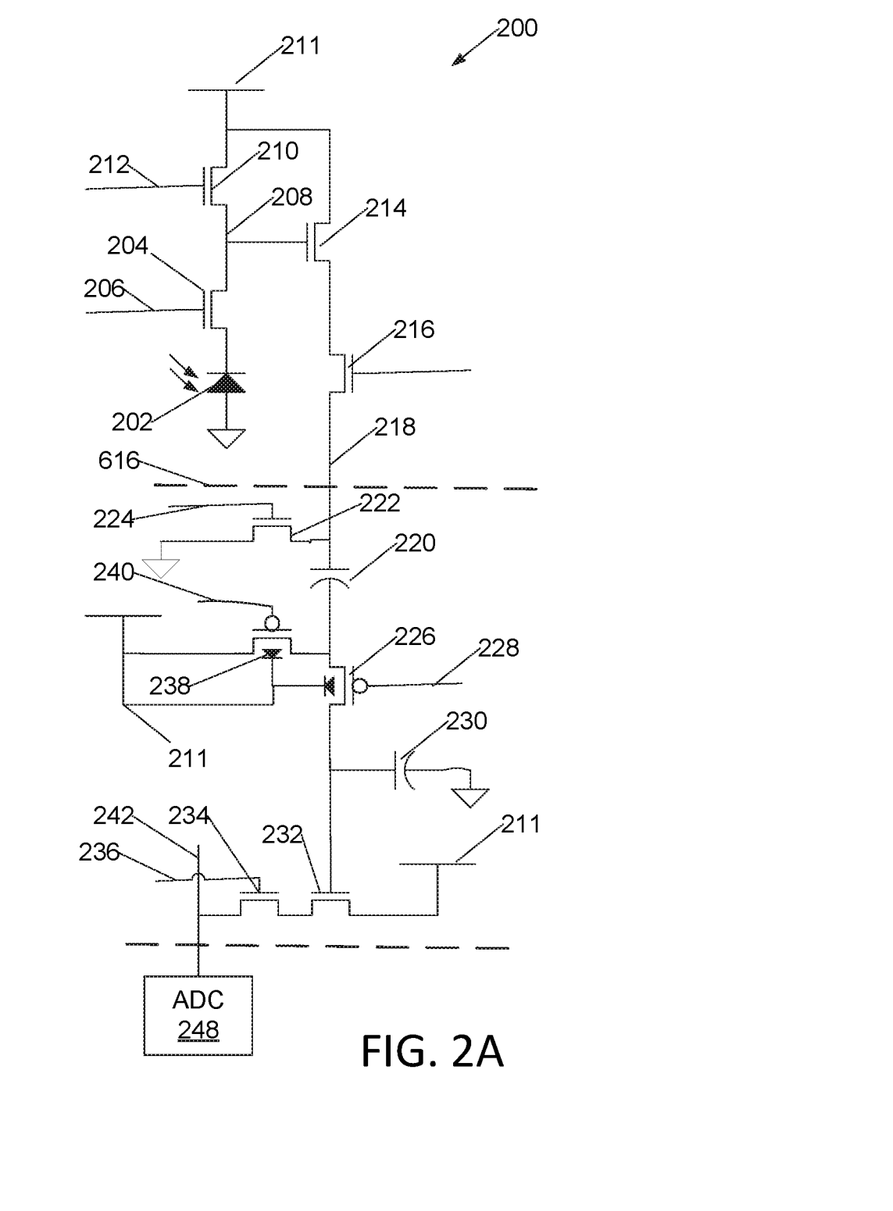
FIG. 2A is a simplified schematic diagram of an embodiment of a pixel and associated circuitry of an improved image sensor.

FIG. 2A shows a schematic diagram of an improved pixel 200 for an image sensor according to an embodiment. The improved pixel 200 has a photodiode 202 coupled through a photodiode selection transistor 204 (or a first selection transistor) to a first pixel node 208. The photodiode selection transistor 204 is controlled by a photodiode selection line 206 (or a first selection line). The first pixel node 208 couples through a photodiode reset transistor 210 (or the first reset transistor) to an analog power 211. The voltage of the analog power 211 in embodiments may be a voltage within the range from 1.8V to 3.3V selected depending upon the application of the image sensor. The photodiode reset transistor 210 is controlled by a photodiode reset line 212. The first pixel node 208 also controls a first source-follower transistor 214. The first source-follower transistor 214 is coupled in series with a second selection transistor 216 to a loaded node 218 and a first terminal of a first, or coupling, capacitor 220. The second selection transistor 216 is controlled by a second selection line. The loaded node 218 also couples to a load transistor 222, which is operated as a current source with grounded source and a current-mirror control voltage 224 received on its gate.

The first, or coupling, capacitor 220, which serves as a coupling capacitor, has a second terminal coupled through a shutter transistor 226 to a first terminal of an image-storage capacitor 230. The shutter transistor 226 is controlled by a shutter line 228. The shutter transistor 226 selectively transfers charges generated by the photodiode 202 to the image-storage capacitor 230 upon receiving the shutter signal from the shutter line 228 during a storage period. A second terminal of the image-storage capacitor 230 is grounded.

The first terminal of the image-storage capacitor 230 also controls a second source-follower transistor 232. The second source-follower transistor 232 is coupled in series with a third selection transistor 234. The third selection transistor 234 is controlled by a third selection line 236. The third selection transistor 234 is coupled to drive a data line 242 that in turn couples the pixel 200 to an analog-to-digital converter (ADC) 248. In many embodiments, data line 242 and ADC 248 are common to multiple pixels 200. One skilled in the art should understand that, the ADC may be connected to the pixel 200 through additional circuitry. It is appreciated that additional circuitry and the ADC are not shown or described in detail to avoid obscuring the teachings of the present invention.

In one embodiment, the shutter transistor 226 and the second reset transistor 238 are P-channel transistors formed in an N-well coupled to the analog power 211. A second reset transistor 238 is controlled by a second reset line 240. The second reset transistor 238 is further coupled to the second terminal of the first, or coupling, capacitor 220. The second reset transistor 238 selectively connected the shutter transistor 226 to the analog power 211 to pull the potential at the node between the shutter transistor 226 and the first terminal of the image-storage capacitor 230, also the source/drain diffusion region of the shutter transistor 226, to a voltage of the analog power 211.

Because the shutter transistor 226 is P-type and located in an N-well clamped at the analog power 211, leakage at high signal levels corresponding to low light reception or "dark"

through the P-N source or drain diffusion attached to the first terminal of the image-storage capacitor 230 is reduced over leakage encountered with similar signal levels in FIG. 1 where the shutter transistor 126 and other transistors including the reset transistors 110, 138, the selection transistors 104, 116, 134, and the source-follower transistors 114, 132 in the pixel 100 are N-type transistors.

When the first terminal of the first, or coupling, capacitor 220 is at a voltage level corresponding to a reset photodiode, the second reset transistor 238 and the shutter transistor 226 are turned on to set the second terminal of the first, or coupling, capacitor 220 to a voltage corresponding to the analog power 211. The second reset transistor 238 is turned off. After exposing the photodiode 202, a photodiode signal couples through the first source-follower transistor 214 setting the first terminal of the first, or coupling, capacitor 220 to a signal level. Signal level of the photodiode signal may correspond to the number of electrons generated by photodiode 202 in response to the incident light during exposure period. During the charge transfer or storage period, this signal level couples through the first, or coupling, capacitor 220 and the shutter transistor 226, placing a proportional signal onto the image-storage capacitor 230. In one embodiment, during the charge transfer or storage period, the gate of the shutter transistor 226 receives a shutter signal of low voltage level from the shutter line 228 and form a signal transmission path from the first, or coupling, capacitor 220 to the image-storage capacitor 230.

Then, the shutter transistor 226 is turned off (e.g., a shutter signal of high voltage level is sent to the gate of the shutter transistor 226) to hold the voltage level that corresponds to the signal at the first terminal of the image-storage capacitor 230 until the signal is read out through the second source-follower transistor 232. Leakage current, also known as dark current may add to the signal on image-storage capacitor 230 after the second reset transistor 238 turns off.

When the voltage level change from reset level to signal level at the first terminal of the first, or coupling, capacitor 220 is zero, representing fully dark, the voltage level at the first terminal of the image-storage capacitor 230 (also the source/drain diffusion region of the shutter transistor 226) remains at the voltage level of the analog power 211, no leakage current or dark current is generated as the voltage level at the first terminal of the image-storage capacitor 230 (also the source/drain diffusion region of the shutter transistor 226) is approximately the same as the potential of the N– well. As such, the dark current generated in a dark or black image is reduced. The dark current generated for a bright image is less of problem as the issue can be handled through subsequent circuit such as correlated double sampling (CDS) circuit.

In this embodiment, all transistors having source or drain attached to the first terminal of the image-storage capacitor 230 are P-type transistors formed in a N well or wells that is coupled to the analog power 211. In this embodiment, a dark exposure level of the pixel corresponds to a voltage in the image-storage capacitor 230 within a difference on the order of millivolts, in a particular embodiment from 1 mV to 100 mV, of the analog power voltage, where the voltage difference results from coupling of the parasitic capacitances associated with the second reset transistor 238 and the shutter transistor 226. In this embodiment, a white exposure level of the pixel corresponds to a voltage in the image-storage capacitor 230 significantly different, with difference on the order of volts, from the analog power voltage.

In this embodiment, momentary high voltages on the image-storage capacitor 230 due to capacitive coupling of switching transients may occasionally nearly forward-bias p-n junctions at the shutter transistor 226, causing a leakage current that degrades dark levels on the image-storage capacitor 230.

In an embodiment, to prevent leakage current flow through the second reset transistor 238 and the shutter transistor 226, the second reset transistor 238 and the shutter transistor 226 are high threshold voltage transistors having low source-drain leakage current. In another embodiment, the signal applied to the gate of the shutter transistor 226 and the second reset transistor 238 is pumped above the analog power voltage when they are turned off to ensure these transistors do not leak.

In an alternate embodiment the voltage level at the source of the second reset transistor 238 is slightly lower than the analog power 211. In this alternative embodiment, there is a small potential difference, for example a 0.2 V difference, between the analog power 211 and the source of the second reset transistor 238 to ensure the second reset transistor 238 has minimal source-drain leakage current when the second reset line 240 is high and the second reset transistor 238 is turned off. In one implementation of this embodiment, the voltage level of the analog power 211 is 2.8V, and the voltage level at the source of the second reset transistor 238 is 2.6V. As such, leakage current, a possible source of dark current, flowing through the second reset transistor 238 and the shutter transistor 226 during pixel operation is reduced or eliminated.

In the embodiment of FIG. 2A, the image-storage capacitor 238 operates to receive signals with negative potential, i.e., signals having voltage with negative polarity and store charges, accordingly.

Figure 2B:
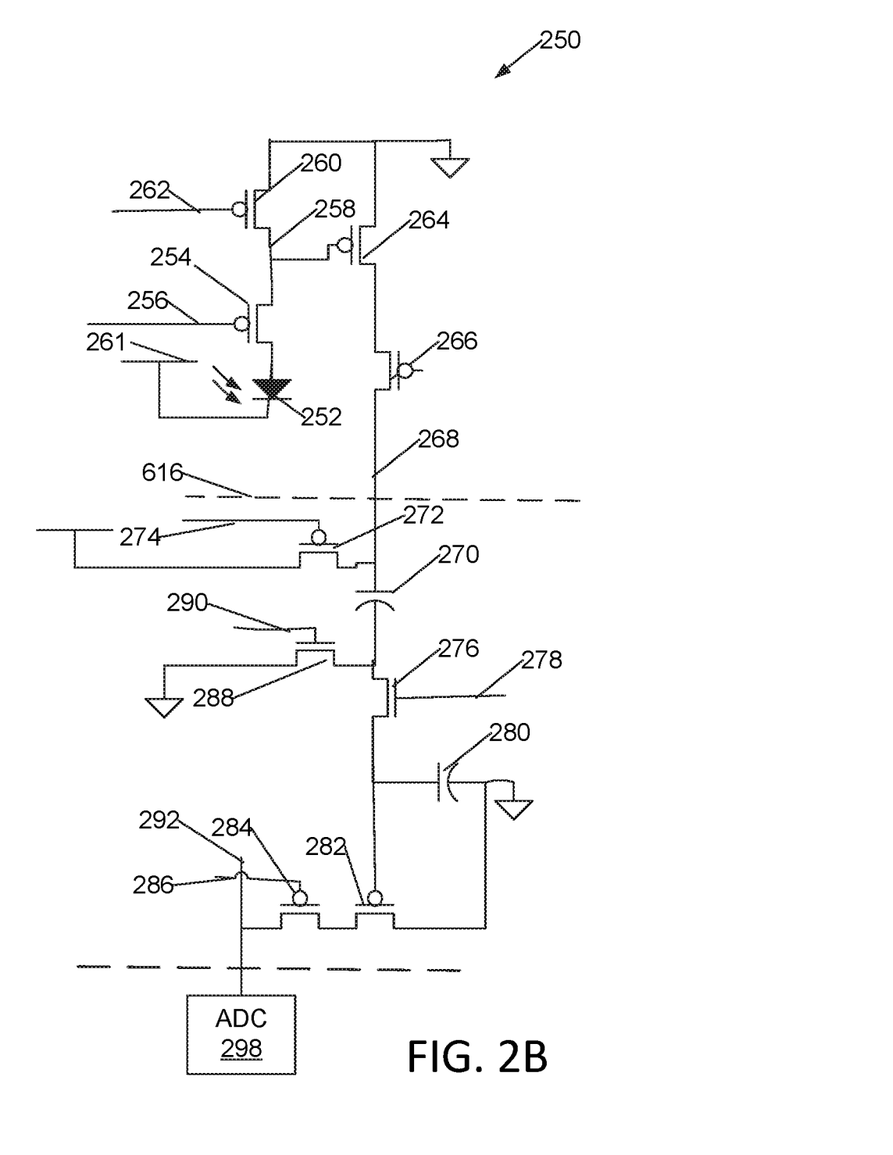
FIG. 2B is a simplified schematic diagram of an embodiment of a pixel and associated circuitry of another improved image sensor.

In another embodiment, the second reset transistor 238 and the shutter transistor 226 are replaced by NMOS transistors in a P-well that is grounded while the other transistors are PMOS transistors in N-wells. As shown in FIG. 2B, which shows a schematic diagram of an improved pixel 250 for an image sensor according to the teaching of the instant disclosure.

Similar to FIG. 2A, the improved pixel 250 has a photodiode 252 coupled through a photodiode selection transistor 254 (or a first selection transistor) to a first pixel node 258. The photodiode selection transistor 254 is controlled by a photodiode selection line 256 (or a first selection line). The first pixel node 258 couples through a photodiode reset transistor 260 (or the first reset transistor) to an analog power 261. The photodiode reset transistor 260 is controlled by a photodiode reset line 262. The first pixel node 258 also controls a first source-follower transistor 264. The first source-follower transistor 264 is coupled in series with a second selection transistor 266 to a loaded node 268 and a first terminal of a first, or coupling, capacitor 270. The second selection transistor 266 is controlled by a second selection line. The loaded node 268 also couples to a load transistor 272, which is operated as a current source with source thereof coupled to the analog power 211 and a current-mirror control voltage 274 received on its gate.

The first, or coupling, capacitor 270 has a second terminal coupled through a shutter transistor 276 to a first terminal of an image-storage capacitor 280. The shutter transistor 276 is controlled by a shutter line 278. The shutter transistor 276 selectively transfers charges generated by the photodiode 252 to the image-storage capacitor 280 upon receiving the shutter signal from the shutter line 278 during a storage period. A second terminal of the image-storage capacitor 280 is grounded.

The image-storage capacitor 280 of FIG. 2B may be sensed in several ways. In one embodiment, the first terminal of the image-storage capacitor 280 also controls a second source-follower transistor 282. The second source-follower transistor 282 is coupled in series with a third selection transistor 284. The third selection transistor 284 is controlled by a third selection line 286. The third selection transistor 284 is coupled to drive a data line 292 that in in an embodiment turn couples multiple pixels 500 to additional processing circuitry that may include an analog-to-digital converter (ADC) 548.

The difference between the improved pixel 250 and the improved pixel 200 is that in FIG. 2B, the photodiode selection transistor 254 (or the first selection transistor), the photodiode reset transistor 260 (or the first rest transistor), the first source-follower transistor 264, the second selection transistor 266, the load transistor 272, the second source-follower transistor 282, the third selection transistor 284 are PMOS transistors while the second reset transistor 288 and the shutter transistor 276 are NMOS transistors in a P-well coupled to a ground of a power supply, also known as a grounded P-well. Reset of the photodiode 252 in pixel 250 is to ground, and the photodiode 252 couple to the analog power 261.

In the embodiment, the image-storage capacitor 280 receives signals with positive potential, which is signals having voltage with low levels indicating dark and high levels indicating light and store charges, accordingly.

Because the second reset transistor 288 and the shutter transistor 276 are NMOS transistors in a P-well that is grounded, dark current generated at the node formed between the shutter transistor 276 and the image-storage capacitor 280 in dark portions of the image is eliminated as the voltage at the node formed between the shutter transistor 276 and the image-storage capacitor 280 approximate the same potential as the grounded P-well.

In an embodiment, to prevent leakage current flow through the second reset transistor 288 and the shutter transistor 276, the second reset transistor 288 and the shutter transistor 276 are high threshold voltage transistors having low source-drain leakage current. In another embodiment, the signal applied to the gate of the shutter transistor 276 and the second reset transistor 288 is pumped below ground when they are turned off to ensure these transistors do not leak.

In the embodiment illustrated in FIG. 2B, a dark exposure level of the pixel corresponds to a voltage in the image-storage capacitor 280 near, on the order of tens of millivolts, in a particular embodiment between—1 mV~−100 mV, the analog power voltage, where the voltage difference from analog power may result from coupling of the parasitic capacitances associated with the second reset transistor 288 and the shutter transistor 276. In this embodiment, a white exposure level of the pixel corresponds to a voltage in the image-storage capacitor 280 significantly, on the order of volts, different from the analog power voltage.

Figure 3:
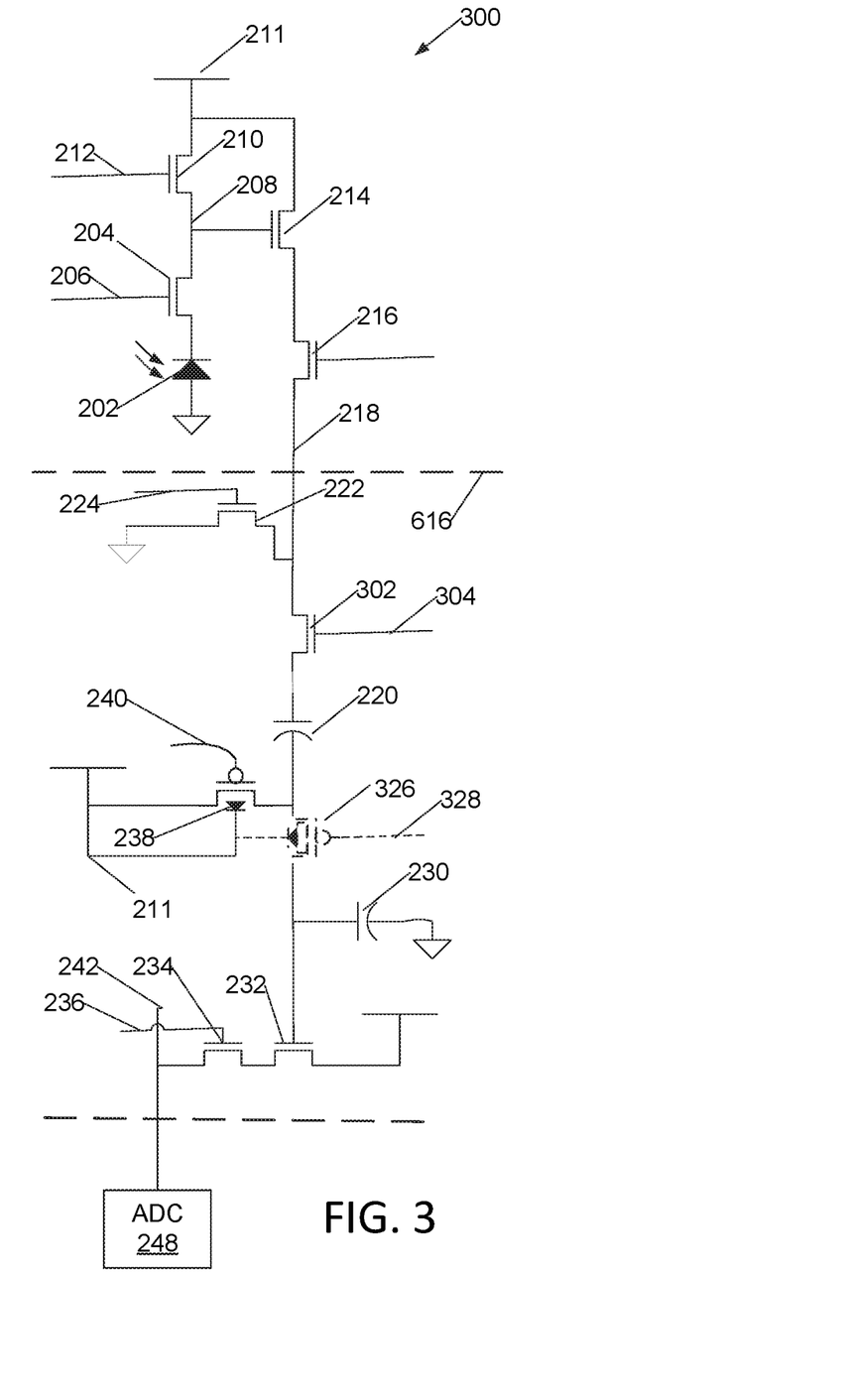
FIG. 3 is a simplified schematic diagram of an embodiment of a pixel and associated circuitry of an alternative embodiment of the improved image sensor.

FIG. 3 shows a pixel 300 for an image sensor according to an alternative embodiment of the present disclosure.

A signal cutoff transistor 302, having a gate controlled by a signal-cutoff control line 304 is inserted between the second selection transistor 216 and the first terminal of the first, or coupling, capacitor 220. The signal cutoff transistor 302 is configured to selectively cut off the electrical connection (e.g., signal transmission path or charge transfer path) between the first terminal of the first, or coupling, capacitor 220 and the first terminal of the image-storage capacitor 330 of the pixel 300 upon receiving a signal cutoff signal. For simplicity, components illustrated in FIG. 3 having the same reference numbers as similar components in FIG. 2A have the same names and functions as the similar and identically numbered component in FIG. 2A. In this embodiment, the momentary high voltages on the image-storage capacitor 230 (FIG. 2A), typically occurring before signals are valid at the image-storage capacitor 230, are blocked from reaching the image-storage capacitor 330 of the embodiment of FIG. 3. The image-storage capacitor 330 of the pixel 300 (FIG. 3) thus lacks such transients and has better dark levels than those stored on the image-storage capacitor 230 in the pixel 200 (FIG. 2A).

In embodiments according to FIG. 3, if a shutter transistor 326 is present it is controlled by the shutter control signal 328. In embodiments with the signal cutoff transistor 302, the shutter transistor 326 may become optional, and can be removed to further reduce leakage on the image-storage capacitor 330.

In the embodiments of FIG. 3, all transistors having source or drain attached to the first terminal of image-storage capacitor 330, are P-type transistors in N− well coupled to the analog power 211.

Figure 4:
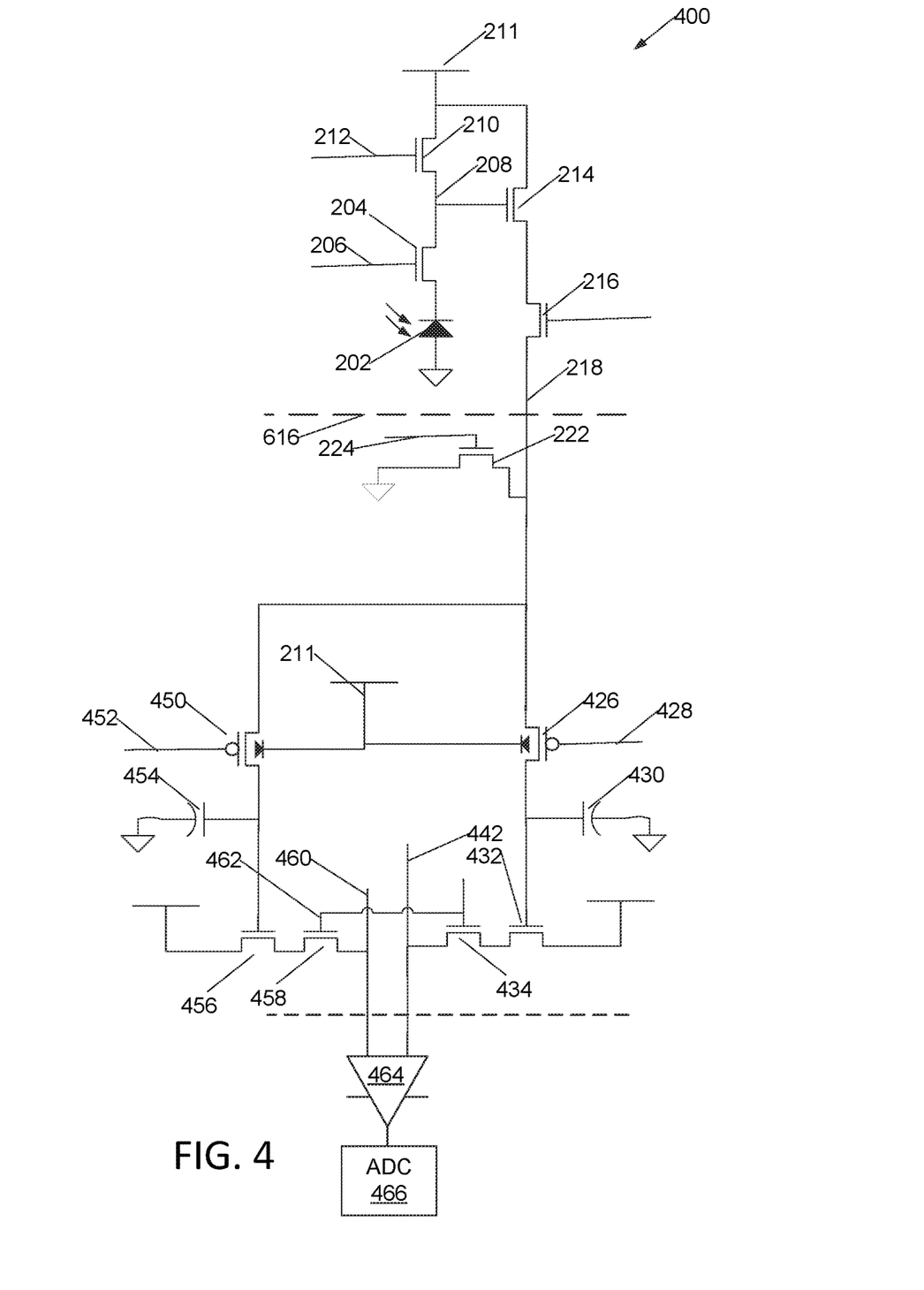
FIG. 4 is a simplified schematic diagram of a differential-sensing embodiment of a pixel and associated circuitry of an alternative embodiment of the improved image sensor.

FIG. 4 shows a pixel 400 in accordance to another embodiment. The pixel 400 is adapted for differential sensing. A reset sampling transistor 450, having a gate thereof controlled by a reset-sampling signal 452, is provided to sample a reset, or fully-dark level, on a first terminal of a reset-sampling capacitor 454. A second terminal of the reset-sampling capacitor 454 is grounded. A signal-sampling transistor 426 having a gate controlled by a signal-sampling signal 428, is provided to sample the signal level on a first terminal of a signal-sampling capacitor 430. A second terminal of the signal-sampling capacitor 430 is grounded. Voltage on the reset-sampling capacitor 454 is configured to control a gate of a reset source-follower 456. The reset source-follower 456 is coupled in series with a reset selection transistor 458. Voltage on the signal-sampling capacitor 430 is configured to control a gate of the second source-follower 434. The reset selection transistor 458 is controlled by the same read select line 462 as the third selection transistor 434. This configuration reads the reset-sampling capacitor 454 through the reset source-follower 456 and the reset selection transistor 458 to a reset sense line 460 simultaneously with the signal-sampling capacitor 430 being read through the second source-follower 432 and the third selection transistor 434 onto the data line 442.

For simplicity, components illustrated on FIG. 4 having the same reference numbers as components illustrated on FIG. 2A have similar function to the components with matching reference numbers illustrated on FIG. 2A.

In an embodiment, the image data signal read from the signal-sampling capacitor 430 and the reset signal read from the reset-sampling capacitor 454 of the pixel circuit is fed to a differential amplifier 464 and an analog-to-digital converter 466 through data lines 442 and 460 shared among multiple pixel circuits, to further reduce noise and improve dark levels over single-ended sensing systems like those of FIGS. 2A and 3. In a particular embodiment, the differential amplifier 464 and an analog-to-digital converter 466 are connected to the pixel 400 through additional circuitry.

In alternative embodiments, alternative differencing techniques are used such as pre-charging capacitively-coupled amplifiers while reading the reset sampling capacitor followed by amplifying signal from the signal-sampling capacitor, or digitizing signals from both the reset-sampling capacitor and the signal sampling capacitor and performing a digital subtraction to provide de-noised digital data.

In the embodiments of FIGS. 2A, 3, and 4, the image-storage capacitors 230, 330, 430 are configured such that the charge storage node has all attached source/drain diffusions being P-type.

In the embodiment of FIG. 4, all transistors having source or drain attached to the first terminal of image-storage capacitor 430, and the first terminal of a reset-storage capacitor 454, are P-type in an N well or N wells coupled to the analog power 211.

Figure 5:
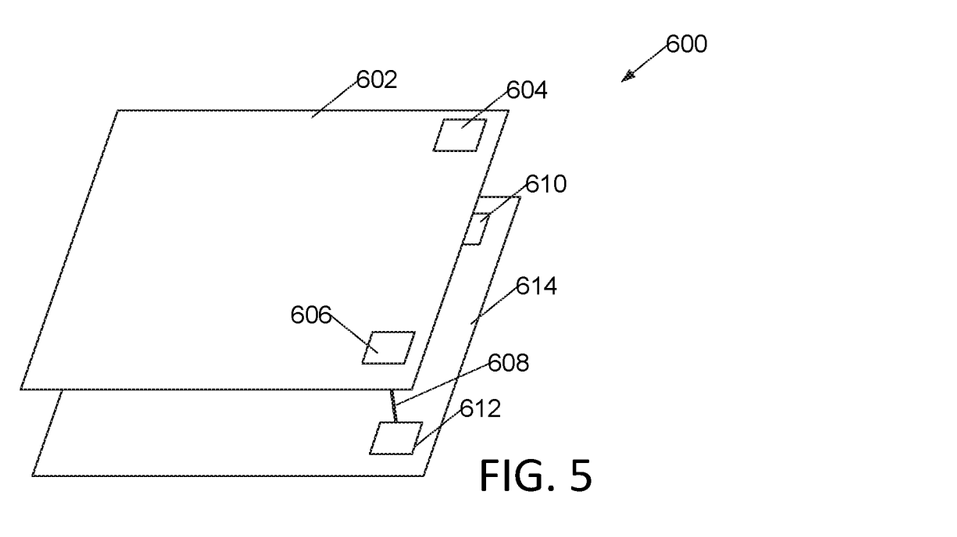
FIG. 5 is an illustration of a multiple-wafer image sensor having pixels realized as in FIGS. 2A-4.

It is expected that the embodiments of FIG. 2A-4 may be implemented on a single-wafer, single-die, image sensor or on a multiple-wafer, multi-die, stacked image sensor such as the two-die stacked embodiment 600 illustrated with reference to FIG. 5. In this embodiment, photodiodes, such as photodiodes 202, with at least diode selection transistors 204 (first selection transistor), are on the first or pixel die 602. In some embodiments, the photodiode reset transistors 210 (first reset transistor) the source-follower transistors 214, and the second selection transistor 216 are implemented on a first (or pixel) die or wafer 602 in pixel groups 604, 606. Each pixel group 604, 606 is electrically coupled by a die-to-die bond 608 to an associate storage capacitor group 610, 612 physically located on a second (or logic) die or wafer 614. This organization corresponds to locating components above a cut line 616 on the first (pixel) die 602 and components below cut line 616 on the second (or logic) die or wafer 614 (see FIGS. 2A-4). The first (pixel) die 602 may be bonded to the second (or logic) die or wafer 614 through die to die or wafer-to-wafer bonding, such as hybrid bonding.

It is appreciated that a global shutter image shutter may include an array of pixels of 200, 300, and 400. The array of pixels may be grouped into a plurality of pixel blocks, where each pixel block may include one, two, or more pixels of 200, 300, and 400. The number of pixels arranged in a pixel block and the number of pixel blocks in the global shutter image shutter system may be configured based on one or more image sensor performance and application requirements. The global shutter image shutter system illustrated with respect to FIG. 2A, FIG. 3, FIG. 4, and FIG. 5 may operate with an exemplary timing operation illustrated in FIG. 6.

Figure 6:
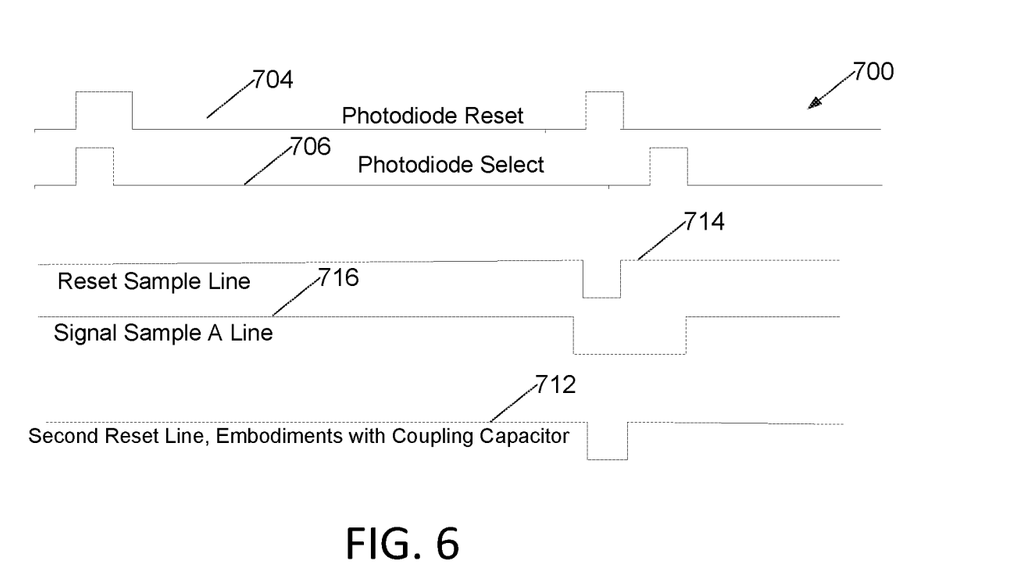
FIG. 6 is a timing diagram for operation of the improved image sensor.

During pre-charge period or reset period, the photodiode reset lines 212, 704 are held high while the photodiode selection lines, such as lines 206, 706, are pulsed one at a time sequentially to reset photodiodes of each pixel block to a reset value, in some embodiments the reset value is the voltage level of the analog power 211. During the pre-charge period, the second reset line 240, 714 and the shutter lines 228, 716 are kept high. All pixel blocks simultaneously having photodiodes reset. A falling edge of each photodiode selection line 206, 706 begins a shutter interval for the associated pixels. The first photodiode selection line 706 of each pixel block is pulsed simultaneously to reset the first photodiode of each pixel block, while subsequent photodiodes of each pixel block are reset in rapid sequence thereafter by additional photodiode selection lines.

The photodiodes are exposed to light for a shutter interval, the length of the shutter interval is chosen depending on overall brightness of the optical image provided to pixels of the pixel array and other factors such as subject movement.

At the end of the shutter interval, pixels of each pixel block are read, and light-dependent signals from each pixel are transferred to the respective image-storage capacitors. In a charge transfer to the image-storage capacitor burst (or charge transfer and storage period), in sequence for each photodiode of the pixel block, the photodiode reset lines 212, 704 are pulsed again with photodiode selection lines 206, 706 low to remove any residual charge on first pixel nodes 208, before reading each pixel, while second reset lines 240, 712 are pulsed low to enable the second reset transistor 238, to clear residual charge on the first or coupling capacitors 220. The pixels are then read to by raising the photodiode selection lines 206.

In differential-sensing embodiments according to FIG. 4, during the time when the photodiode reset line 704 is high and the second reset line 712 is low, a sample reset voltage is captured on the reset-sampling capacitor 454 by pulsing the reset sampling signals 452, 714 low. It should be noted that reset sampling signal 714 does not exist in embodiments lacking a reset-sampling capacitor 454.

After the photodiode reset line 704 pulse ends, the first photodiode select line 706 is pulsed to read accumulated photocurrent from the photodiode (e.g., photodiode 202) onto first pixel nodes, such as first pixel nodes 208, 258. Shutter lines 228, 716 are pulsed low, and in embodiments having a signal cutoff transistor 302 its signal cutoff control line 304 (not shown in FIG. 7) is pulsed high, to read accumulated photocurrent through first pixel nodes 208, 258 and thereby place a charge dependent on light exposure of the pixel onto the respective image-storage capacitors 230, 280. The sequence of photodiode reset line pulsing high, with second reset line 712 pulsing low, then pulsing an additional photodiode select line 708 high and capturing the signal on an image-storage capacitor with the shutter line 720, is repeated for each additional photodiode and image-storage capacitor associated with the photodiode of the respective pixel in the pixel block. Second reset line 712 is used in embodiments where a coupling capacitor 220 is present, pulsing during each reset to ensure residual charge on nodes associated with the coupling capacitors is erased between reading pixels.

In a particular embodiment, the global shutter image shutter system as herein disclosed includes control logic circuitry that generates control signals including reset signals, photodiode selection signals, signal cut off signals, and shutter signals according to the timing sequence illustrated in FIG. 6, to control the operation of the pixels in the array of pixel.

Similarly, a global shutter image sensor system having an array of pixels 250, may operate with an inverted scheme of the illustrated timing diagram of FIG. 6. During pre-charge period or reset period, the photodiode reset lines 262, 704 are pulsed low with photodiode reset signals and photodiode selection lines, such as 256, 702 are pulsed low sequentially, to reset the photodiode to the reset value, while the second reset line 290, 714 and the shutter lines 278, 716 are kept low. During the exposure period, the photodiode reset lines 262, 704 are held low while the photodiode selection lines, such as lines 256, 706, are pulsed low one at a time sequentially to reset photodiodes of each pixel block. During the charge transfer to the image-storage capacitor burst, in sequence for each photodiode of the pixel block, the photodiode reset lines 262, 704 are pulsed low again with photodiode selection lines 256, 706 high to remove any residual charge on first pixel nodes 258, before reading each pixel, while second reset lines 290, 712 are pulsed high to enable the second reset transistor 288, to clear residual charge on the first or coupling capacitors 270.

In some embodiments, the length of the charge transfer to image-storage capacitor period and the pre-charge period are equal, and each is far shorter than a time required for all the image-storage capacitors to be read through data lines 242 into, and converted to digital form, by an ADC externally connected to the pixels 200, 250, 300 through additional circuitry.

Combinations of Features

The features herein disclosed may be combined in various ways in embodiments. The signal cutoff transistor illustrated in FIG. 3 may be used with the embodiments otherwise discussed with reference to FIG. 4. Further, it is expected that any of the embodiments discussed with reference to FIGS. 2A-4 may be implemented on a single-die image sensor, on a dual-die stacked multi-wafer image sensor as depicted in FIG. 5, or on an image sensor having additional stacked die such as a digital memory die or wafer.

In particular embodiments, combinations anticipated include:

An image sensor designated A has an array of pixels, each pixel having an associated shutter transistor coupled to transfer a charge dependent on light exposure to the pixel onto an image storage capacitor, the image-storage capacitors being configured to be read into an analog to digital converter, where the shutter transistors are formed in wells coupled to a power supply, and where a dark exposure level of the pixel corresponds to a voltage in the image-storage capacitor near a voltage of a power supply coupled to the well in which the shutter transistor is formed, and a white exposure level of the pixel corresponds to a voltage in the image storage capacitor significantly different from the power supply coupled to the well in which the shutter transistor is formed.

An image sensor designated AA1 including the image sensor designated A wherein the shutter transistors are P-channel transistors in N-wells coupled to analog power.

An image sensor designated AA2 including the image sensor designated A wherein the shutter transistors are N-channel transistors in P-wells coupled to ground.

An image sensor designated AA3 including the image sensor designated A, AA1, or AA2, wherein the charge dependent on light exposure couples to the image-storage capacitors through coupling capacitors.

An image sensor designated AA including the image sensor designated A, AA1, AA2, or AA3 wherein pixels of the pixel array are organized in pixel units including at least one photodiode and at least one selection transistor, the selection transistor coupling the photodiode to a first pixel node, the first pixel node coupled through a source follower and a first (or coupling) capacitor to the shutter transistor.

An image sensor designated AAA including the image sensor designated AA further including a signal cutoff transistor coupled between the selection transistor and the coupling capacitor.

An image sensor designated AAB including the image sensor designated A, AA, AAA, AA1, AA2, or AA3 where each pixel unit comprises a plurality of photodiodes coupled through selection transistors to the first pixel node.

An image sensor designated AAC including the image sensor designated A, AA, AAA, AAB, AA1, AA2, or AA3 where a second photodiode and selection transistor couple to a second pixel node, the second pixel node coupled through a source follower to the first (or coupling) capacitor.

An image sensor designated AB, including the image sensor designated A, AA, AAA, AAB, AAC, AA1, AA2, or AA3 further including a reset sampling transistor configured to sample a charge dependent on a reset level on a reset sampling capacitor, and where the image storage capacitors are coupled to be read into the analog to digital converter through a differential amplifier having an input coupled to the reset sampling capacitor.

A method designated B of capturing a digital electronic image including resetting a plurality of photodiodes, and exposing the photodiodes to an optical image; reading the photodiodes and storing charge dependent on photodiode exposure onto a plurality of image storage capacitors, charge being stored onto each image storage capacitor through nodes where all attached source/drain diffusions are of a first conductivity type and formed in wells of a second conductivity type, the charge dependent on photodiode exposure provides a voltage on the image storage capacitor for photodiodes exposed to dark portions of the optical image closer to a voltage coupled to the wells than for photodiodes exposed to light portions of the optical image; sensing charge in the image storage capacitors with source followers having channel formed of the second type conductivity into an analog to digital converter; and using the analog to digital converter to convert the sensed charge into a digital image. The first conductivity type is opposite to the second conductivity type.

A method designated BA including the method designated B further comprising passing the charge dependent on photodiode exposure through coupling capacitors.

A method designated BB including the method designated B or BA further comprising latching a charge corresponding to a photodiode reset level in a reset capacitor, and wherein sensing charge in the image-storage capacitors further comprises amplifying difference between a signal dependent on charge in the image storage capacitors and a signal dependent on charge in the reset capacitor.

A method designated BC including the method designated B, BA, or BB where the first conductivity type is P-type and the second conductivity type is N-type as understood in the art of semiconductor field-effect transistors.

A method designated BD including the method designated B, BA, or BB where the first conductivity type is N-type and the second conductivity type is P-type as understood in the art of semiconductor field-effect transistors.

A method designated D of capturing a digital electronic images including resetting a plurality of photodiodes and exposing the photodiodes to an optical image; storing charge corresponding to a reset photodiode on a reset capacitor; reading the photodiodes and storing charge dependent on photodiode exposure onto a plurality of image storage capacitors, charge being stored onto each image storage capacitor through nodes having all directly connected source/drain diffusions P-type, and the charge dependent on photodiode exposure provides a higher voltage on the image storage capacitor for photodiodes exposed to dark portions of the optical image than for photodiodes exposed to light portions of the optical image; sensing difference in charge between the reset capacitor and the image storage capacitors with N-channel source followers and a differential amplifier coupled into an analog to digital converter; and converting the sensed charge into a digital image using the analog to digital converter.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An image sensor comprising:
an array of pixels, each pixel having an associated shutter transistor coupled to simultaneously transfer a charge dependent on light exposure to the pixel onto an image-storage capacitor, there being an image-storage capacitor for each pixel, the image-storage capacitors being configured to be read into an analog to digital converter,
wherein the shutter transistors are formed in wells coupled to a power supply, and where a dark exposure level of the pixel corresponds to a voltage in the image-storage capacitor near a voltage of a power supply coupled to the well in which the shutter transistor is formed, and a white exposure level of the pixel corresponds to a voltage in the image-storage capacitor significantly different from the voltage of the power supply coupled to the well in which the shutter transistor is formed;
wherein each pixel further comprises a photodiode and a selection transistor of a first channel type, the selection transistor coupling the photodiode to a pixel node, the pixel node coupled through a source follower of the first channel type and a first coupling capacitor to the shutter transistor wherein the shutter transistor is of a second channel type.

2. The image sensor of claim 1 wherein the shutter transistors are P-channel transistors in N-wells coupled to an analog power.

3. The image sensor of claim 1 wherein the shutter transistors are N-channel transistors in grounded P-wells.

4. The image sensor of claim 1 wherein each pixel further comprises a photodiode and a selection transistor, the selection transistor coupling the photodiode to a pixel node, the pixel node coupled through a source follower and a first coupling capacitor to the shutter transistor.

5. The image sensor of claim 4 further comprising a signal cutoff transistor coupled between the selection transistor and the first coupling capacitor, the signal cutoff transistor selectively cut off a charge transfer path between the first coupling capacitor and the selection transistor.

6. The image sensor of claim 4 further comprising signal reset transistors coupled between the analog power and the image-storage capacitors, the signal reset transistors configured to set the image-storage capacitors to the analog power upon receiving a reset signal.

7. The image sensor of claim 2 further comprising a reset sampling transistor configured to sample a charge dependent on a reset level on a reset sampling capacitor, wherein the image-storage capacitors are coupled to be read into the analog to digital converter through a differential amplifier having an input coupled to the reset sampling capacitor.

8. The image sensor of claim 1 wherein the image-storage capacitors and the shutter transistors are implemented on a same die.

9. The image sensor of claim 3 wherein the image-storage capacitors are coupled to the pixels through coupling capacitors.

10. The image sensor of claim 2 wherein each pixel further comprises a photodiode and a selection transistor, the selection transistor coupling the photodiode to a pixel node, the pixel node coupled through a source-follower transistor and a first coupling capacitor to the shutter transistor.

11. The image sensor of claim 3 further comprising a reset sampling transistor configured to sample a charge dependent on a reset level on a reset sampling capacitor, wherein the image-storage capacitors are coupled to be read into the analog to digital converter through a differential amplifier having an input coupled to the reset sampling capacitor.

12. The image sensor of claim 8 wherein the photodiodes and image-storage capacitors associated with each pixel are formed on separate dies in a multi-die structure.

13. A method of capturing a digital electronic image comprising:
resetting a plurality of photodiodes, and exposing the photodiodes to an optical image;
reading the photodiodes through a source follower and storing charge dependent on photodiode exposure simultaneously onto a plurality of image storage capacitors, each image-storage capacitor node having all directly connected source/drain diffusions of a first conductive type formed in a well of a second conductive type, the charge dependent on photodiode exposure providing on the image-storage capacitor a voltage closer to a voltage coupled to the well for photodiodes exposed to dark portions of the optical image than for photodiodes exposed to light portions of the optical image;
sensing charge in the image-storage capacitors with source followers with channel of the second conductive type into an analog to digital converter; and
converting the sensed charge into a digital image using the analog to digital converter; the source follower having source/drain diffusions of the second conductive type.

14. The method of claim 13, wherein the first conductive type is a P-type and the second conductive type is an N-type.

15. The method of claim 13, wherein the first conductive type is an N-type and the second conductive type is a P-type.

16. The method of claim 13 further comprising passing the charge dependent on photodiode exposure through a plurality of first coupling capacitors.

17. The method of claim 14 further comprising sending a cutoff signal to signal cutoff transistors to selectively cut off the connection between coupling capacitors and image-storage capacitors.

18. The method of claim 15 further comprising sending a cutoff signal to signal cutoff transistors to selectively cut off the connection between coupling capacitors and image-storage capacitors.

19. The method of claim 13 further comprising latching a charge corresponding to a photodiode reset level in a reset capacitor, and wherein sensing charge in the image-storage capacitors further comprises amplifying difference between a signal-dependent charge in the image-storage capacitor and a signal-dependent charge in the reset capacitor.

* * * * *